United States Patent [19]
Li

[11] Patent Number: 6,085,433
[45] Date of Patent: Jul. 11, 2000

[54] TAPE MEASURE WITH INNOVATED BRAKE STRUCTURE

[76] Inventor: Shinh Lin Li, 1F, No. 22, Lane 81, sec. 2, Thnha S. Rd., Taipei, Taiwan

[21] Appl. No.: 09/173,263

[22] Filed: Oct. 15, 1998

[51] Int. Cl.$^7$ .................................................. G01B 3/10
[52] U.S. Cl. ........................... 33/767; 33/755; 242/381.3
[58] Field of Search ............................. 33/767, 755, 761, 33/768, 770

[56] References Cited

U.S. PATENT DOCUMENTS

| | | | |
|---|---|---|---|
| 4,194,703 | 3/1980 | Roe | 242/381.3 |
| 4,903,912 | 2/1990 | Coughlin | 242/381.1 |
| 4,938,430 | 7/1990 | Chapin | 242/381.3 |
| 4,976,048 | 12/1990 | Blackman | 33/767 |
| 5,007,178 | 4/1991 | Dewire et al. | 33/767 |
| 5,210,956 | 5/1993 | Knispel et al. | 33/761 |
| 5,379,523 | 1/1995 | Wingert | 33/767 |
| 5,395,069 | 3/1995 | Chen | 242/381.3 |
| 5,791,581 | 8/1998 | Loeffler et al. | 242/380 |
| 5,806,202 | 9/1998 | Blackman et al. | 33/767 |

FOREIGN PATENT DOCUMENTS 2108930  5/1983  United Kingdom .................... 33/767

*Primary Examiner*—Diego Gutierrez
*Assistant Examiner*—Faye Francis
*Attorney, Agent, or Firm*—Raymond Y. Chan; David and Raymond

[57] ABSTRACT

A tape measure with innovated brake structure characterized in that the brake mechanism comprises a release key, a brake, and a stopper. The upper end of the brake is in connection with the release key, and an intermediate protrusion of the brake directly presses its upper end so as to control the stopper able to be tightly pressing the tape surface against a stop block provided thereunder. By the above described structure, the user may press the release key with a finger to retract the extended tape after measurement work has been completed. When the release key is released, the brake actuates the stopper to directly press the tape surface against the stop block thereby halting the tape therebetween and the braking function is thus performed.

1 Claim, 3 Drawing Sheets

TAPE MEASURE WITH INNOVATED BRAKE STRUCTURE

BACKGROUND OF THE INVENTION

1. Field of the Invention

The present invention relates to a tape measure with innovated brake structure, and more particularly, to a brake structure for a tape measure which can conveniently control the retraction of the measuring tape.

2. Description of the Prior Art

The tape measure is frequently used in the construction site for professional measurement, estimation and examination. It is also often used for domestic application such as house repairing or furniture making done by the house owner himself in do-it-yourself way. However, a simple conventional tape measure has a lot of shortcomings, especially in its brake mechanism, those shortcomings are:

1. The clamping claw acting as a brake mechanism for the tape measure will not operate promptly and properly to hold the tape in its extended position, that in the worst case, the tape strongly retracts if it is not carefully controlled, and results in hurting the user himself or a third person staying nearby.

2. The clamping claw for a conventional tape measure can not bear frequent on-off operation resulting in high fault rate. A brake mechanism formed of spring, screws and other steel component is prone to wear out rapidly and shortens the lifetime of a tape measure and results in increasing its production cost.

3. It is difficult to operate when several successive measurement are required, as it is not easy to halt the tape appropriately at the desire length for measurement with a conventional brake mechanism.

4. A conventional tape measure with such brake mechanism is not only hard for a skilled user to handle, but also dangerous for housewives or children to use it in DIY work for fear of sudden retract notion of the tape when measuring a large scale object may cause injury to the human body.

Through a long term study and efforts, the applicant has developed an innovated brake structure for a tape measure which can solve the above mentioned problems of conventional products, and the invention will now be disclosed hereinafter.

SUMMARY OF THE INVENTION

It is a first object of the present invention to provide a tape measure with innovated brake structure which can surely and securely halt the tape at any desired position during its retraction.

It is a second object of the present invention to provide a tape measure with innovated brake structure simply but reliably constructed with a very low fault possibility.

It is a third object of the present invention to provide a tape measure with innovated brake structure which can be easily handled for all persons, and also can be manufactured with fairly low cost.

To achieve these and other objects, the gist of the present invention is directed to provide a tape measure with innovated brake structure characterized in that the brake mechanism comprises a release key, a brake, and a stopper. The upper end of the brake is in connection with the release key, and an intermediate protrusion of the brake directly presses its upper end so as to control the stopper able to be tightly pressing the tape surface against a stop block provided thereunder.

By the above described structure, the user may press the release key with a finger to retract the extended tape after measurement work has been completed. When the release key is released, the brake actuates the stopper to directly press the tape surface against the stop block thereby halting the tape therebetween and thus performing the desired brake function.

BRIEF DESCRIPTION OF THE DRAWINGS

The invention, as well as its many advantages, may be further understood by the following detailed description and drawings in which.

DETAILED DESCRIPTION OF THE PREFERRED EMBODIMENT

Figure 1:
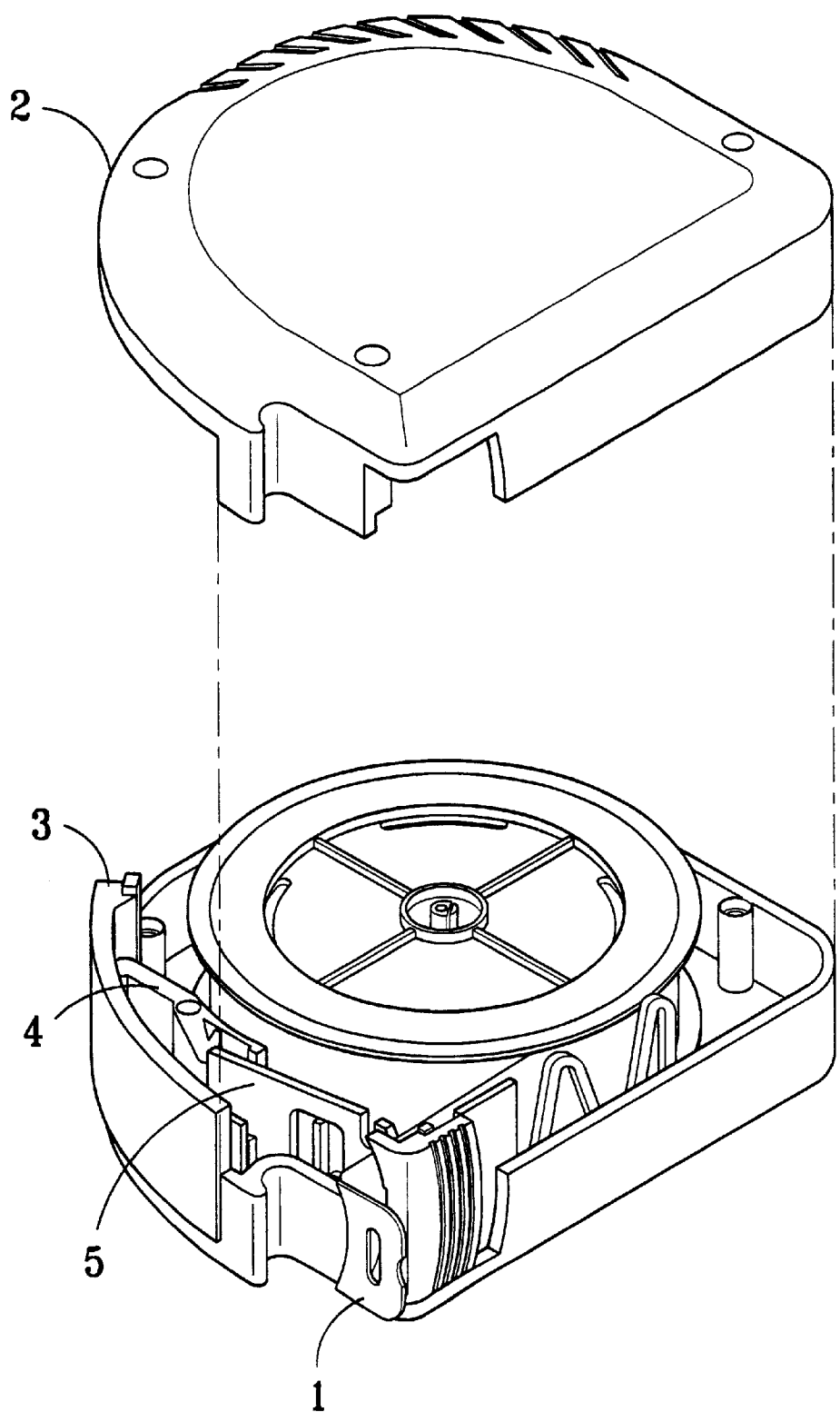
FIG. 1 is a three dimensional perspective drawing of the tape measure with innovated brake structure according to the present invention.
Figure 2:
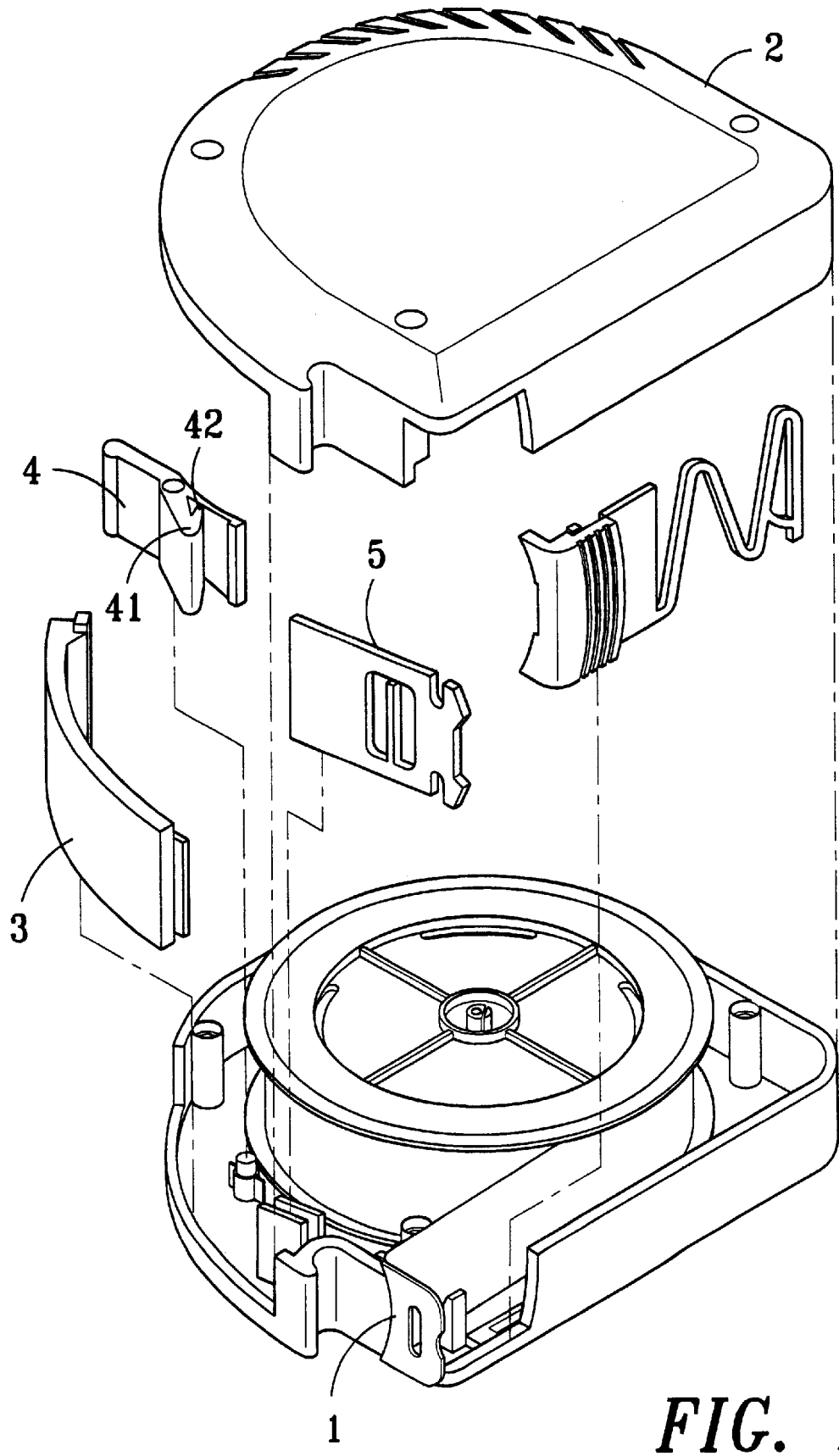
FIG. 2 is a three dimensional exploded drawing of the tape measure with innovated brake structure according to the present invention.

Referring to FIGS. 1 and 2, the tape measure with innovated brake structure of the present invention comprises mainly a tape 1, a housing 2, and a brake mechanism. The surrounding of the upper surface of the housing 2 is formed into a serrated edge with a plurality of tilted tooth. The whole appearance of the housing 2 is in a form like a human head configuration. The brake mechanism further comprises a two-ends release key 3 provided in the housing 2, one end of the release key 3 is engaged to the housing 2, while the other end remains free to move.

The brake mechanism further includes a brake 4 having two ends, the upper end is in connection with the release key 3 while the other end and the intermediate portion are engaged to the housing 2, further to this, the brake 4 has an intermediate protrusion 41 and a recessed portion 42 extending downward.

The brake mechanism further comprises a stopper 5 with two ends, the upper end is in connection with the brake 4 while the other lower end is facing against a stop block 51 to let the tape 1 pass through the gap therebetween so as to control the motion of the tape 1, either be released or halted.

Figure 3:
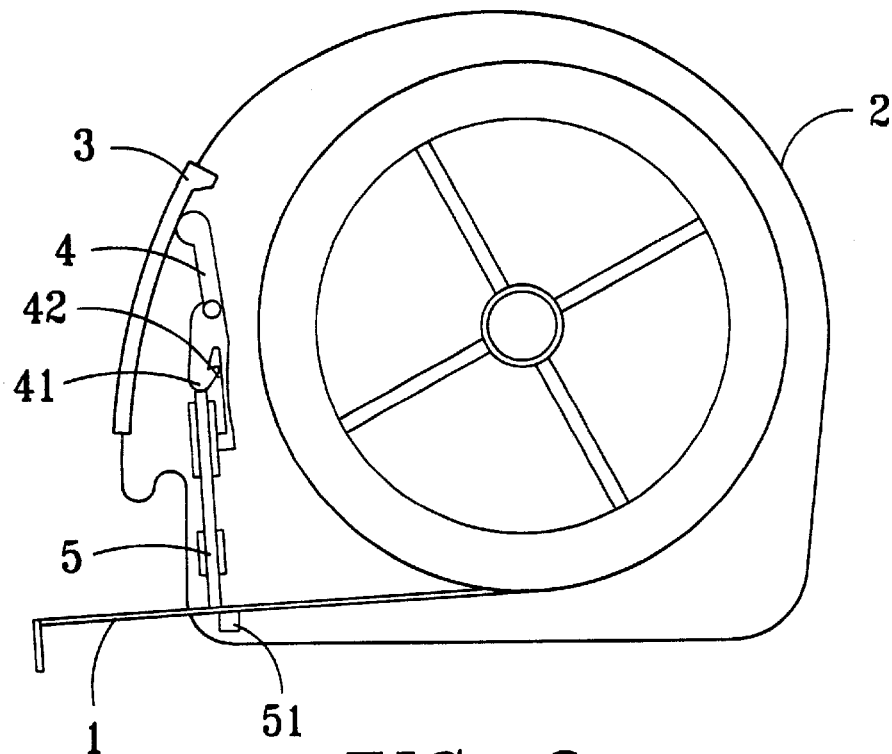
FIG. 3 is an illustrative drawing showing the operational principle of the brake mechanism according to the present invention.
Figure 4:
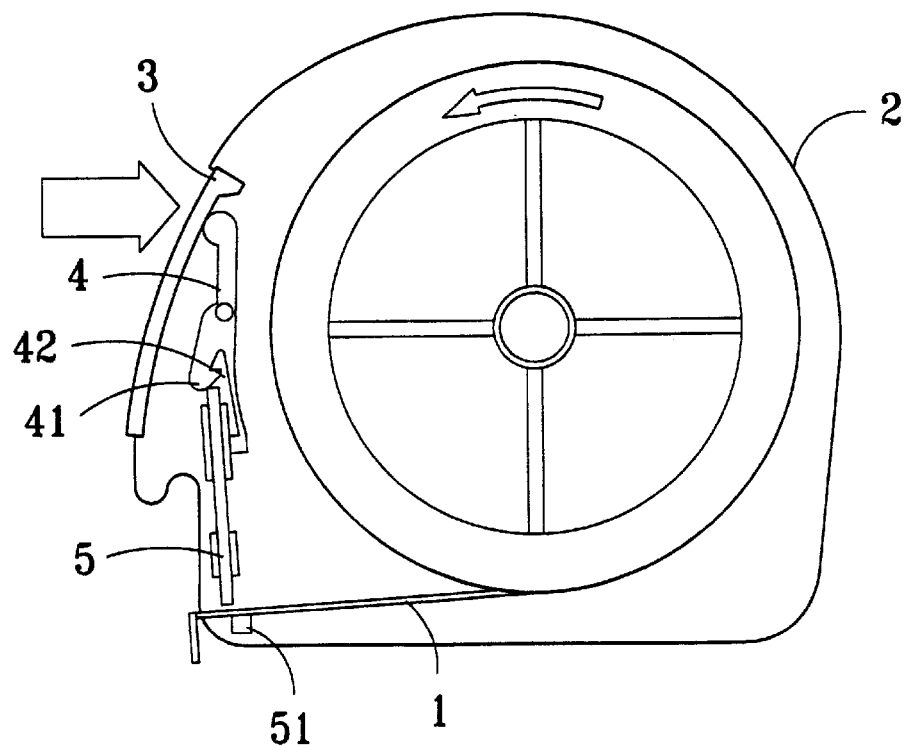
FIG. 4 is an illustrative drawing showing release of brake function according to the present invention.

Referring to FIGS. 3 and 4, the structure of the present invention is characterized in that when the release key 3 is pressed by the user's finger under the state the tape 1 is drawn out and extended, the upper end of the brake 4 which being in connection with the release key 3, is actuated to make the brake 4 tentatively deforms with respect to its original shape. At this moment, the stopper 5, being affected by the reaction force produced by retracting motion of the tape 1, displaces upward and pushes its upper end into the recessed portion 42 formed on the brake 4 such that the retracting force of the tape 1 overcomes the halting force produced between the stopper 5 and the stop block 51 so that the tape 1 can be retracted and wound back to the housing 2.

As the release key 3 is released free from pressing by the user's finger, the brake 4 returns to its original shape, and its intermediate protrusion 41 pushes the stopper 5 downward accordingly so that the tape 1 is tightly gripped and halted between the stopper 5 and the stop block 51 thereby performing the desired braking function.

The advantages of the brake structure for a tape measure according to the present invention compared with that for conventional tape measures are summarized as follows:

1. The fear of sudden retraction of the tape is eliminated by reliable braking function available any time during the operation of the tape measure, the security for the user is greatly ensured.

2. One side arrangement of all the components in the housing, no need of any springs and screws makes the assembly of the tape measure of the present invention simple, easy and stable.

3. Conventional notorious high fault rate clamp claws are not used in the tape measure of the present invention so that the accident entailed by inferiority of brake mechanism may be prevented.

4. Unique appearance and versatile practicability will surely be welcome in the market.

Many changes and modification in the above described embodiment of the invention can, of course, be carried out without departing from the scope thereof. Accordingly, to promote the progress in science and the useful arts, the invention is disclosed and is intended to be limited only by the scope of the appended claims.

What is claimed is:

1. A tape measure comprising:

a tape;

a housing, wherein its upper surface is surrounded by a serrated edge with a plurality of tilted tooth, said tape being mounted with said housing and a brake mechanism mounted within said housing;

said brake mechanism further including:

a two-ends release key provided in said housing, one end of said release key being engaged to said housing, while the other end remains free to move; and a brake having two ends, an upper end of said two ends of said brake being in connection with said release key while the other end of said brake and an intermediate portion of said release key are engaged to said housing, said brake having an intermediate protrusion and a recessed portion extending downward in a direction perpendicular to the upper surface of said housing; and a stopper with two ends, an upper end of said two ends being in connection with said brake while a lower end of said two ends face against a stop block to let said tape pass through a gap therebetween so as to control a motion of said tape, either be released or halted; and wherein the brake structure is characterized in that when said release key is pressed by user's finger, said tape is drawn out and extended, the upper end of said brake, which is in connection with said release key is actuated to make said brake tentatively deform with respect to its original shape, while at the same time, said stopper, is affected by a reaction force produced by a retracting motion of said tape, said stopper is displaced upward and pushes its upper end into said recessed portion formed on said brake such that the retracting force of said tape overcomes a halting force produced between said stopper and said stop block so that said tape can be retracted and wound back into said housing, and when said release key is released free from pressing by the user's finger, the brake returns to its original shape, and its intermediate protrusion pushes said stopper downward accordingly so that said tape is tightly gripped and halted between said stopper and said stop block thereby performing the desired braking function.

* * * * *